Darby & Young,
Wood Planing Machine.

N°17,873. Patented July 28, 1857.

Witnesses
Wm N. Smith
G. W. Stanley

Inventors:
George Darby
James E. Young

UNITED STATES PATENT OFFICE.

GEO. DARBY AND JAS. E. YOUNG, OF AUGUSTA, MAINE.

SHELL-ROLLER BED FOR PLANING-MACHINES.

Specification of Letters Patent No. 17,873, dated July 28, 1857.

*To all whom it may concern:*

Be it known that we, GEORGE DARBY and JAMES E. YOUNG, both of Augusta, in the county of Kennebec and State of Maine, have invented certain new and useful Improvements in Machines for Planing Lumber; and we do hereby declare that the following is a full, clear, and exact description of the construction and operation of the same, reference being had to the accompanying drawings, and to the letters of reference marked thereon, making a part of this specification, the same letters marked upon the different figures referring to like parts.

Figure 1:
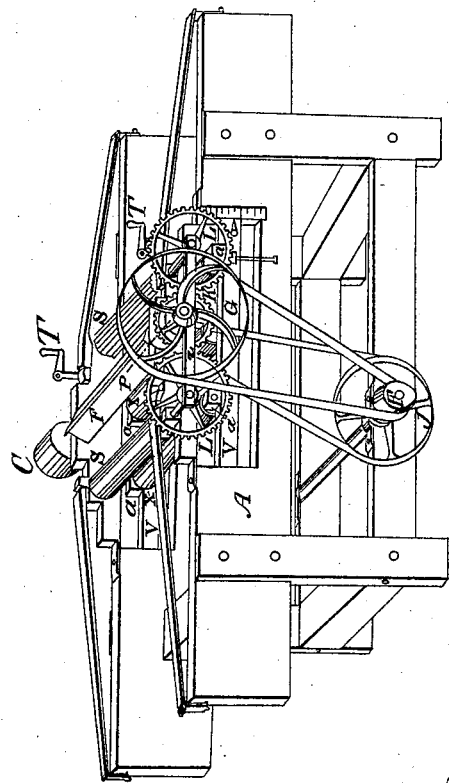

Figure 1 is a perspective view of the machine, showing its principal parts and their mode of arrangement. A, is the frame which supports the working parts. F, is the cutter cylinder and cutters having a pulley upon each end of the shaft, of which C, is the driving pulley and P, communicates motion to other parts. S S, are the feed rollers, one of the bearings of each being of sufficient length to receive the gears L L, and to support the bar Z. K is a pinion attached to the pulley G, and is sustained by the bar Z, the said pinion meshing into the gears L L. V V, are sliding bars upon which the bed rollers X X X, rest. *a a a a a a*, are rocker boxes for the bed rollers which are adjusted in the sliding bars, V V, so as to allow them to work transversely in conformity to any angle that the bed rollers X X X, may be set. T T, are screw rods with crank and handles and are connected with the sliding bars V V, so that by turning the said screw rods the bed rollers X X X, are raised or lowered as may be required.

Figure 2:
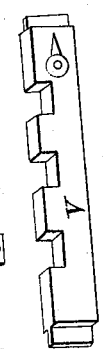

Fig. 2 is a view of one of the sliding bars V, showing the form of the ends, there being grooves in the frame A, to receive them, so as to allow them to slide up and down the space in the said frame. Also in this figure is shown the spaces in which the rocker boxes are adjusted when together in the machine.

Figure 3:
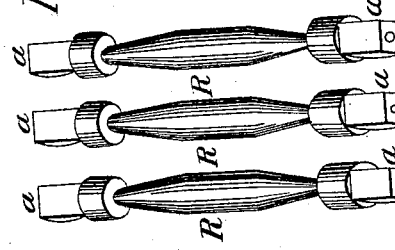

Fig. 3 is a transverse section of which R R R, are bevel grooved rollers, the said rollers making the bed on which the lumber rests while being planed. The said bevel grooved rollers are particularly designed and adapted to planing clapboards, as by this arrangement two clapboards can be planed at the same time, thereby being capable of doing double the work of the common machines. *a a a a a a*, are the worker boxes.

Figure 4:
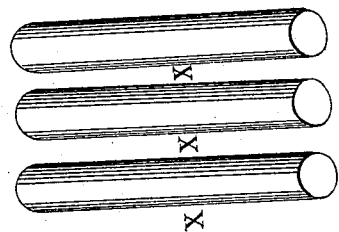

Fig. 4 represents the hollow or shell rollers X X X, being of sufficient size inside to receive the bevel grooved rollers R R R, and when placed upon the said grooved rollers and adjusted in the machine they thereby make a level bed and when these rollers are so arranged in the machine one within the other by turning the screw rods T T, they can be set on any angle so as to plane any bevel that may be desired, and by setting the said rollers on a level, level planing is done.

Motion being applied to the driving pulley C, Fig. 1, the band upon the pulley P, passing over the pulley J, and another band passing from pulleys F to G, communicate motion to the feed rollers S S, through pinion K, and gears L L.

We are aware that cylinder or revolving cutters and also that pressure or yielding feed rollers have been used in planing machines, likewise that motion has been applied to the feed rollers in various ways. Therefore we do not claim either of these arrangements in connection with our invention. Nor do we claim the rocker boxes and sliding bars upon which the bed rollers rest.

What we claim as our improvement, and desire to secure by Letters Patent, is:

The combination of the hollow or shell rollers X X X, with the bevel grooved rollers R R R, whereby a bevel grooved or a straight bed is formed in the manner and for the purpose as herein described.

GEORGE DARBY.
JAMES E. YOUNG.

Witnesses:
ASAPH R. NICHOLS,
W. H. BROOKS.